US006982707B2

(12) United States Patent
Wang

(10) Patent No.: US 6,982,707 B2
(45) Date of Patent: Jan. 3, 2006

(54) METHOD AND APPARATUS UTILIZING DIRECT DIGITAL SYNTHESIZER AND SPREAD SPECTRUM TECHNIQUES FOR REDUCING EMI IN DIGITAL DISPLAY DEVICES

(75) Inventor: Vincent Wang, San Jose, CA (US)

(73) Assignee: Genesis Microchip Inc., Alviso, CA (US)

( * ) Notice: Subject to any disclaimer, the term of this patent is extended or adjusted under 35 U.S.C. 154(b) by 373 days.

(21) Appl. No.: 10/323,557

(22) Filed: Dec. 18, 2002

(65) Prior Publication Data

US 2003/0174126 A1 Sep. 18, 2003

Related U.S. Application Data

(60) Provisional application No. 60/364,981, filed on Mar. 14, 2002.

(51) Int. Cl.
G09G 5/00 (2006.01)

(52) U.S. Cl. .......................... 345/213; 327/105; 327/113

(58) Field of Classification Search ................ 345/204, 345/94, 99, 211–213; 327/100, 105, 113, 327/144, 148, 117; 375/130, 132
See application file for complete search history.

(56) References Cited

U.S. PATENT DOCUMENTS

| 5,382,913 | A  | 1/1995 | Carson et al. |
| 6,044,124 | A  | 3/2000 | Monahan et al. |
| 6,188,255 | B1 | 2/2001 | Mann |
| 6,232,952 | B1 | 5/2001 | Eglit |
| 6,292,507 | B1 | 9/2001 | Hardin et al. |

FOREIGN PATENT DOCUMENTS

| EP | 1137186    | 9/2001 |
| WO | WO0021237  | 4/2000 |
| WO | WO0137428  | 5/2001 |
| WO | WO0163768  | 8/2001 |

OTHER PUBLICATIONS

Owen, D., "A New Approach to Fractional-N Synthesis," Electronic Engineering, Morgan-Grampian Ltd., London GB, vol. 62, No. 759, Mar. 1, 1990, pp. 35-36 and 38.
International Search Report in corresponding PCT application PCT/US03/08066, mailed Dec. 4, 2003.

Primary Examiner—Kent Chang
(74) Attorney, Agent, or Firm—Beyer Weaver & Thomas, LLP

(57) ABSTRACT

A DDS circuit arranged to provide a selectable spread spectrum based output clock signal is described. The synthesizer includes a phase accumulator circuit, a reference clock source coupled to the phase accumulator circuit arranged to provide a reference clock signal, a frequency shifter unit coupled to the phase accumulator, a nominal phase source coupled to the phase accumulator coupled to the frequency shifter unit arranged to provide a nominal phase signal, and a modulated phase source coupled to the frequency shifter unit arranged to provide a modulation signal. The frequency shifter unit combines the nominal phase signal and the modulation signal to form a frequency shift signal as input to the phase accumulator which uses the frequency shift signal to sample the reference clock signal so as to produce the output clock signal having a central frequency and a frequency spread based upon the modulation signal.

16 Claims, 10 Drawing Sheets

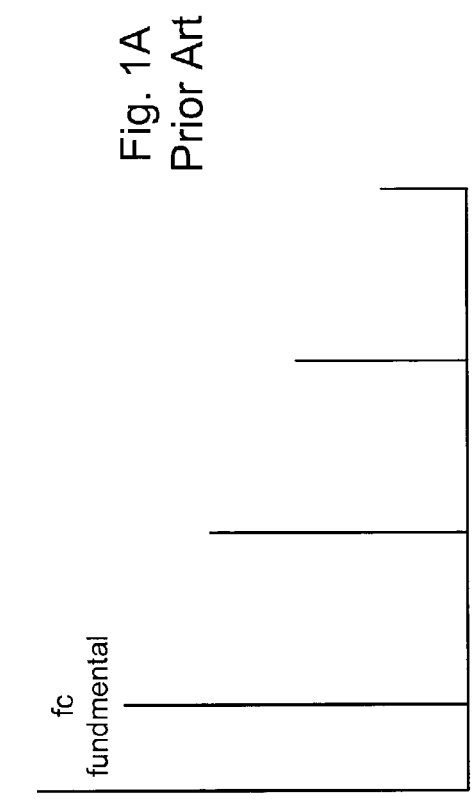
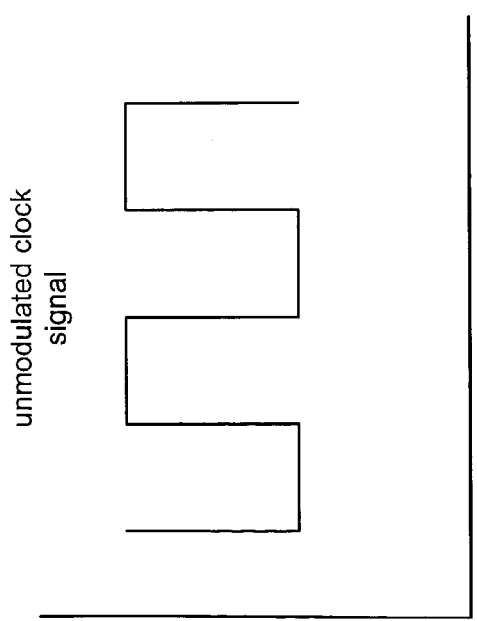
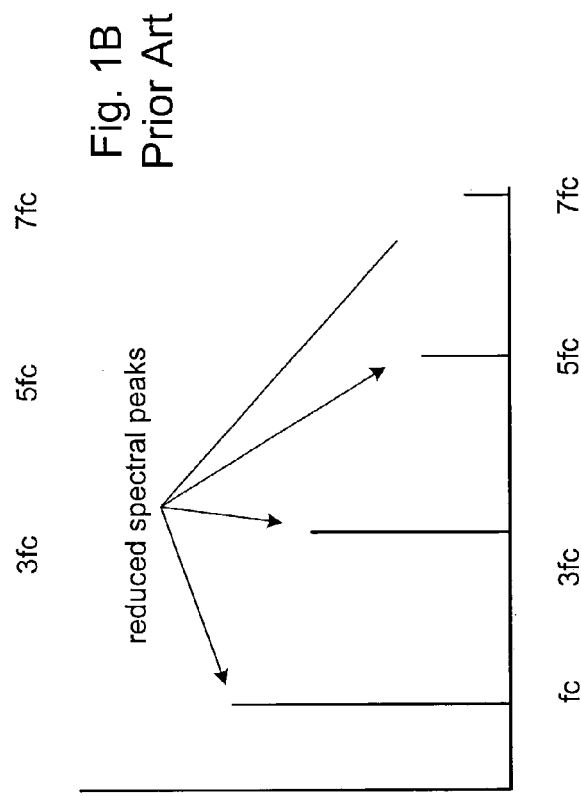
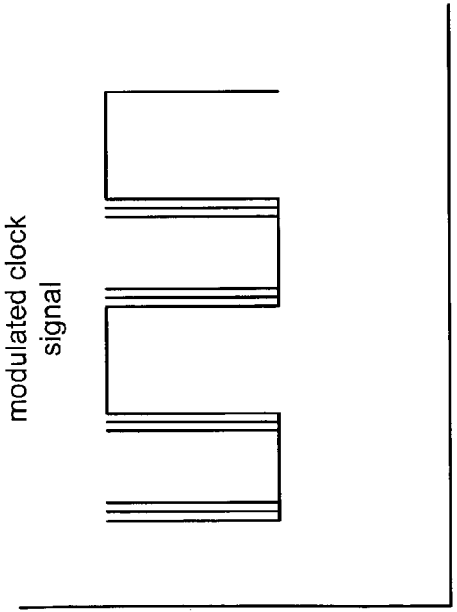
Fig. 1A Prior Art
Fig. 1B Prior Art

US 6,982,707 B2

METHOD AND APPARATUS UTILIZING DIRECT DIGITAL SYNTHESIZER AND SPREAD SPECTRUM TECHNIQUES FOR REDUCING EMI IN DIGITAL DISPLAY DEVICES

CROSS REFERENCE TO RELATED APPLICATIONS

This application takes priority under 35 U.S.C. § 119 (e) of U.S. Provisional Patent Application No. 60/364,981 entitled "METHOD AND APPARATUS UTILIZING DIRECT DIGITAL SYNTHESIZER AND SPREAD SPECTRUM TECHNIQUES FOR REDUCING EMI IN DIGITAL DISPLAY DEVICES" by Wang filed Mar. 14, 2002 which is incorporated by reference in its entirety for all purposes

BACKGROUND OF THE INVENTION

1. Field of the Invention

The invention relates to liquid crystal displays (LCDs). More specifically, the invention describes a method and apparatus for reducing electromagnetic interference in a liquid crystal display.

2. Discussion of Related Art

Electromagnetic interference (EMI) is a measure of the amount of interference that an electronic device (the unintentional transmitter) disturbs an intentional receiver. Not surprisingly, EMI is a major concern in design of devices, such as PCs, flat panel monitors, etc, that rely on high speed components, because it determines whether a system, PC motherboard, graphics controller, etc gets approved for sale by the US Department of Commerce. This situation is especially true in designs that feature high speed (e.g., Pentium-class) processors, high-speed buses, and several clock outputs. Typically, EMI testing occurs late in the design process, so failing the test can mean expensive redesign and increased time to market. In addition to material costs, using shielding as a way to reduce EMI significantly increases production complications, further driving up system cost.

There are, however, various techniques to reduce and/or eliminate EMI. One such technique is referred to as pulse shaping which requires control of the output waveshape in order to control higher frequency harmonics. However, pulse shaping does not control the spectral energy of the fundamental but only changes the shape of the rising edge by rounding off the corners and reducing some of the higher frequency components and their energy. Therefore, pulse shaping works if one can control the portion of the waveform near the switching threshold.

An additional problem with pulse shaping is that the balancing act between too much rounding and not enough rounding to achieve the desired EMI reduction is made even more complex since temperature and voltage variations disrupt the balance. This balancing act is further complicated by the fact that techniques used for optimum rounding may not give consistent results from run to run in manufacturing. For example, carefully set capacitive or resistive shaping values change from production lot to production lot requiring overdesign of the system to ensure that process variations leave sufficient EMI control and rise time.

Yet another approach to reducing EMI referred to as slew-rate control manages the rising-edge slope by maintaining an output drive that doesn't overcharge load capacitance. Slew-rate control achieves this maintenance by creating a current-controlled output that avoids having a fast, high current and should theoretically be effective. However, as with pulse shaping, a major issue is maintaining control on a manufacturing lot-to-lot basis and across various voltage and temperature ranges. The design must account for the worst-case process and for both high and low temperatures and voltages. These potential variations are both critical and unpredictable. As a result, slew-rate control is difficult to implement and unreliable.

Finally, the most popular approach to reducing EMI, referred to as spread spectrum technology (SST), spreads the energy of a fundamental frequency to minimize any peaking of energy at specific frequencies. This technique reduces both the fundamental-frequency EMI and the higher frequency harmonic components, significantly reducing overall system EMI radiation without compromising clock-edge rise and fall times (see FIGS. 1A–1B). With lower spectrum-peak amplitudes, a system meets and has more margin for EMI. Spread spectrum is the simplest, most efficient technique and offers the most immunity to manufacturing-process variations. Accordingly, the use of SST has pervaded the motherboard market to the point where it is being used in virtually all designs using chipsets that support a 100 MHz front side bus (FSB) as well as for PCI, CPU, and memory buses. All motherboard chipset vendors are designing their parts to work with spread-spectrum timing signals.

A useful component in the frequency conversion of discrete signals is a direct digital synthesizer (DDS). The DDS usually performs a frequency step-down function. A summation unit adds an n-bit value SF stored in a SF register to the n-bit value from the output of a phase accumulator. The sum is synchronously updated upon each rising edge of a clock signal SCLK. The phase accumulator feeds the n-bit DDS frequency $F_{DDS}$ to the output module, and feeds back $F_{DDS}$ to a summation unit, thereby generating, over some number of SCLK cycles, a staircase periodic signal with a frequency given by the formula in Equation (2) below:

$$F_{DDS} = \frac{SF}{2^n} F_{SCLK} \qquad (2)$$

where $F_{SCLK}$ is the frequency value of SCLK. An output module converts a DDS frequency signal $F_{DDS}$ to a destination clock DCLK. An output module could, for example, convert the staircase waveform into a binary clock signal with frequency $F_{DDS}$. It should be noted that the jitter in the period of staircase periodic signal is equal to the SCLK period. If the SCLK period varies over a wide range (i.e., has high jitter), then it may be difficult (or impossible) to design the output module to reduce the jitter effectively.

Therefore what is desired is an efficient method and apparatus for reducing EMI using spread spectrum technology by providing a selectable frequency modulated clock signal.

SUMMARY OF THE INVENTION

According to the present invention, methods, apparatus, and systems are disclosed for reducing EMI using spread spectrum technology by providing a selectable frequency modulated clock signal are disclosed.

In one embodiment, a clock synthesizer circuit arranged to provide a selectable spread spectrum based output clock signal that includes a phase accumulator circuit, a reference clock source coupled to the phase accumulator circuit arranged to provide a reference clock signal, a frequency shifter unit coupled to the phase accumulator, a nominal phase source coupled to the phase accumulator, coupled to the frequency shifter unit arranged to provide a nominal phase signal, and a modulated phase source coupled to the frequency shifter unit arranged to provide a modulation signal. The frequency shifter unit combines the nominal phase signal and the modulation signal to form a frequency shift signal as input to the phase accumulator which uses the frequency shift signal to sample the reference clock signal so as to produce the output clock signal having a central frequency and a frequency spread based upon the modulation signal.

In another embodiment, a method of providing a selectable spread spectrum based output clock signal is described. The method includes operations for providing a phase accumulator circuit, coupling a reference clock source to the phase accumulator circuit arranged to provide a reference clock signal, and coupling a frequency shifter unit to the phase accumulator. The method further includes coupling a nominal phase source to the phase accumulator coupled to the frequency shifter unit arranged to provide a nominal phase signal and coupling a modulated phase source to the frequency shifter unit arranged to provide a modulation signal.

BRIEF DESCRIPTION OF THE DRAWINGS

The invention will be better understood by reference to the following description taken in conjunction with the accompanying drawings.

FIG. 1A shows a representative clock signal and associated harmonic based EMI.

FIG. 1B illustrates a spread spectrum processing of the representative clock signal of FIG. 1A and a resulting reduction in harmonic EMI levels.

DETAILED DESCRIPTION OF SELECTED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

In one embodiment, a direct digital synthesizer circuit (DDS) arranged to provide a selectable spread spectrum based output clock signal is described. The synthesizer includes a phase accumulator circuit, a reference clock source coupled to the phase accumulator circuit arranged to provide a reference clock signal, a frequency shifter unit coupled to the phase accumulator, a nominal phase source coupled to the phase accumulator coupled to the frequency shifter unit arranged to provide a nominal phase signal, and a modulated phase source coupled to the frequency shifter unit arranged to provide a modulation signal. The frequency shifter unit combines the nominal phase signal and the modulation signal to form a frequency shift signal as input to the phase accumulator that produces the output clock signal having a central frequency and a frequency spread based upon the modulation signal.

The invention will now be described in terms of a spread spectrum system and methods of use thereof capable of being incorporated in an integrated semiconductor device well known to those skilled in the art used to provide a modulated clock signal to an LCD. It should be noted, however, that the described embodiments are for illustrative purposes only and should not be construed as limiting either the scope or intent of the invention.

Figure 2:
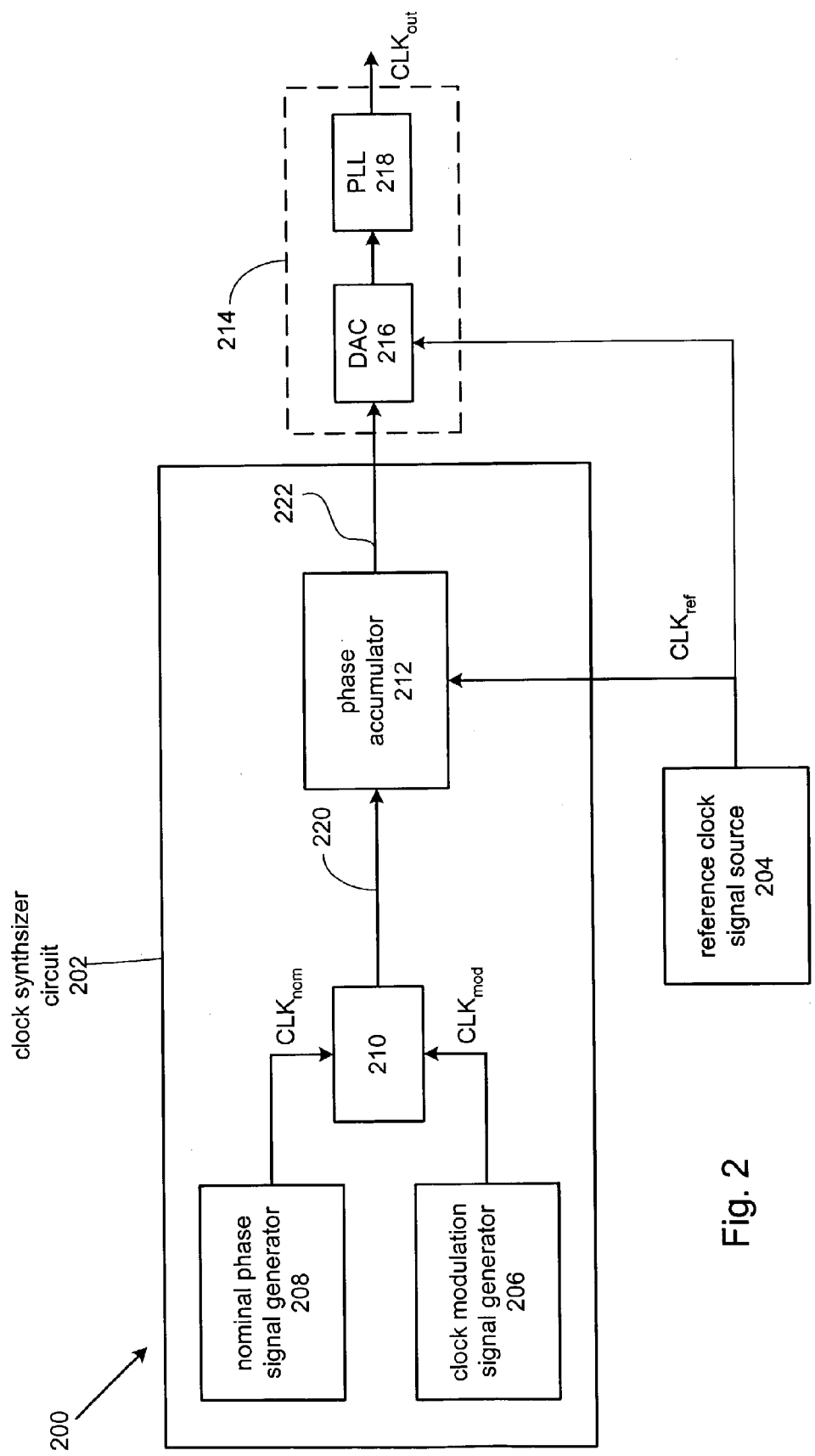
FIG. 2 shows a system for providing a selectable modulated system clock in accordance with an embodiment of the invention.
Figure 3:
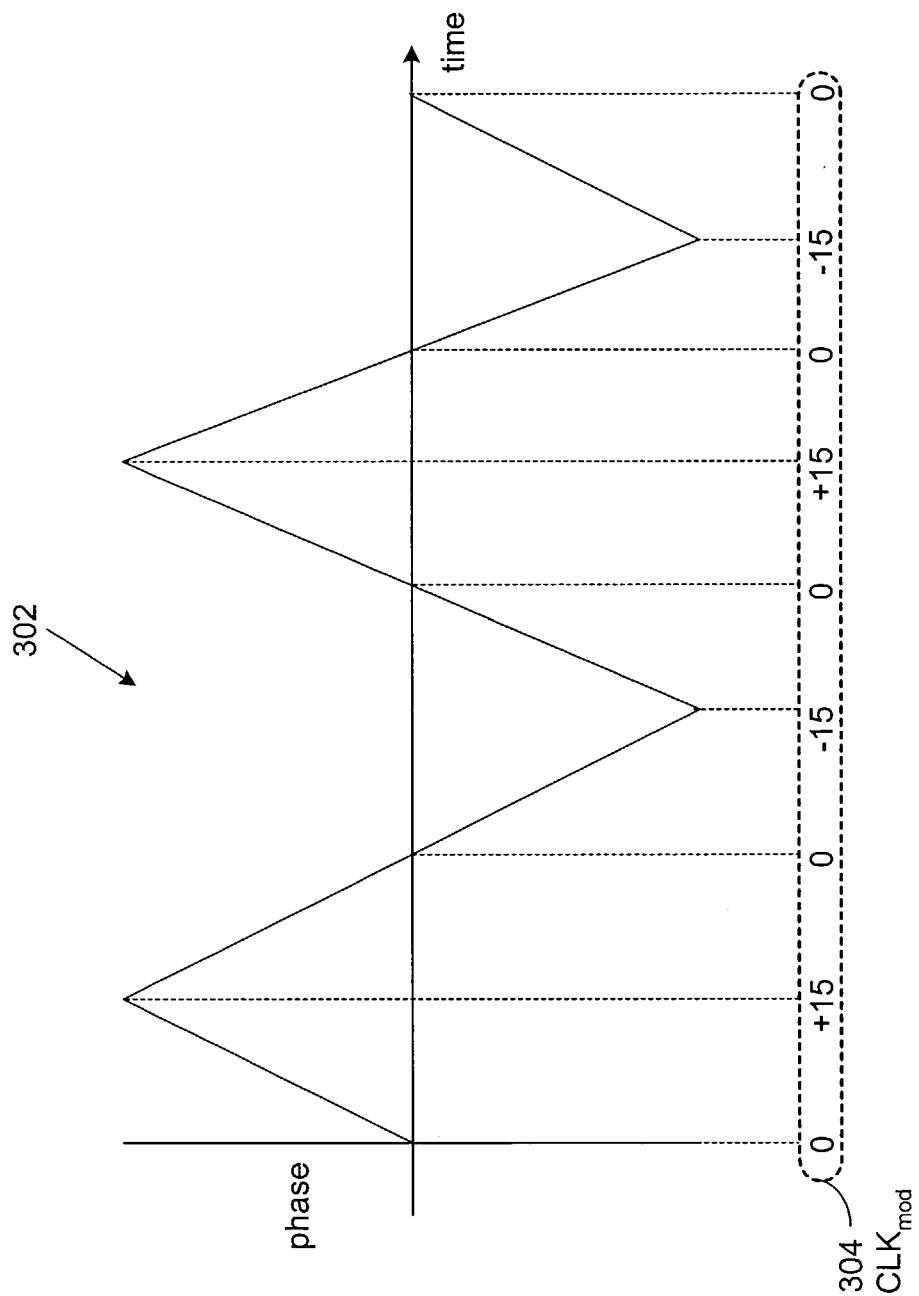
FIG. 3 shows a representative bipolar signal in accordance with an embodiment of the invention.

Accordingly, FIG. 2 shows a spread spectrum system 200 in accordance with an embodiment of the invention. The system 200 includes a DDS circuit 202 arranged to modify a reference clock signal $CLK_{ref}$ received from a reference clock signal source 204 based upon a clock modulation signal $CLK_{mod}$ provided by a clock modulation signal generator 206 and a nominal signal $CLK_{nom}$ provided by a nominal signal generator 208. Each of the clock modulation signal generator 206 and the nominal signal generator 208 is coupled to an adder unit 210 having an output coupled to a phase accumulator 212. It should be noted that the clock modulation signal $CLK_{mod}$ is a periodic bipolar signal (i.e., has symmetric positive and negative-going waveform) having an average value of substantially zero. One such signal is illustrated in FIG. 3 showing both a clock modulation signal waveform 302 and an associated clock modulation signal $CLK_{mod}$ that in this case takes the form of a series of hexadecimal waveform values 304. In this way, even though an output clock $CLK_{out}$ signal is frequency modulated by the variation of the clock modulation signal $CLK_{mod}$, yet its central frequency remains unchanged.

In the described embodiment, an output circuit 214 included in the clock modulation circuit 202 is used to provide in some cases, an analog modulated clock signal using an digital to analog converter (DAC) 216 coupled to a phase locked loop (PLL) circuit 218 well known to those skilled in the art.

Figure 4A:
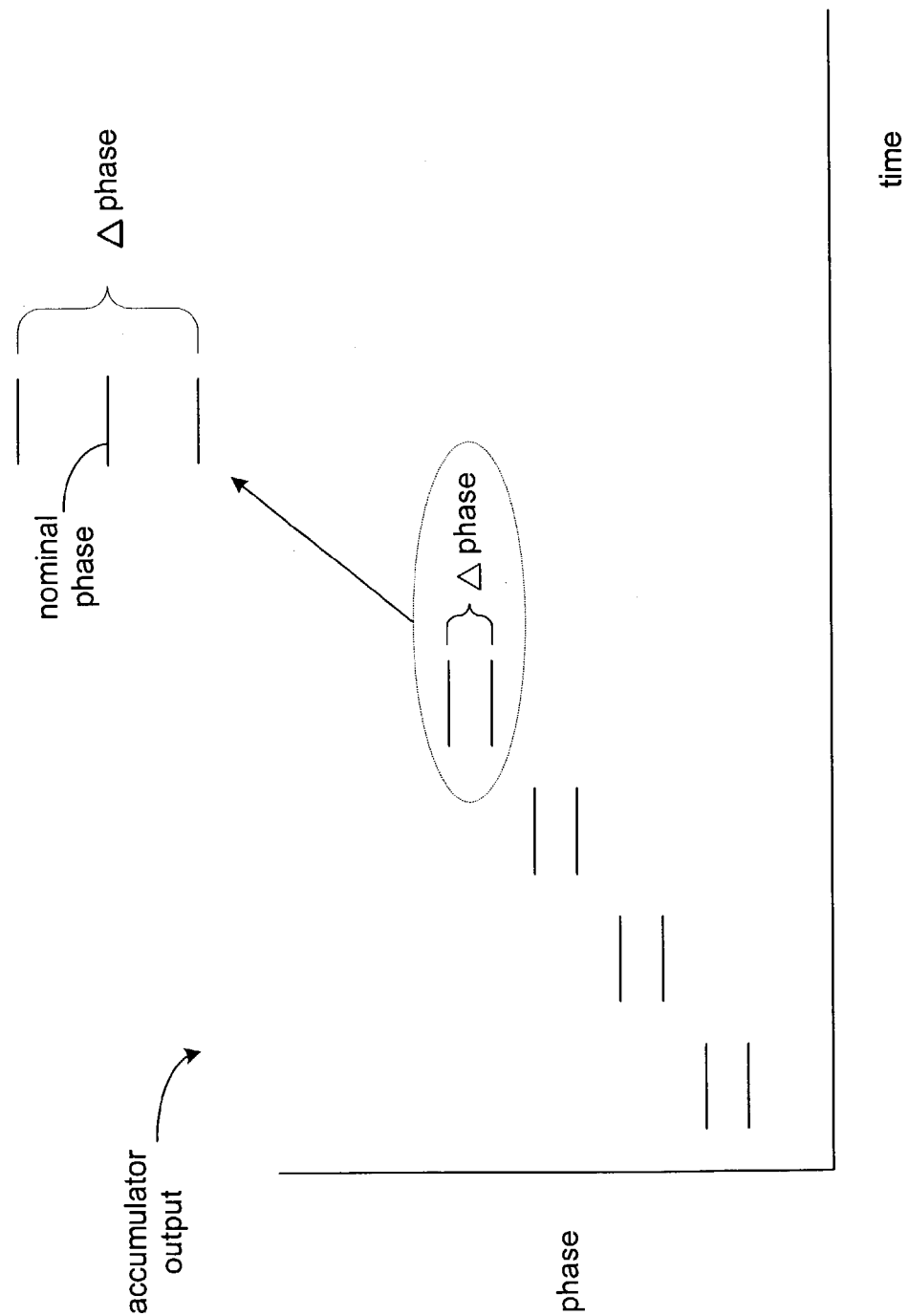
FIGS. 4A–4C shows representative output signals in accordance with an embodiment of the invention.
Figure 4B:
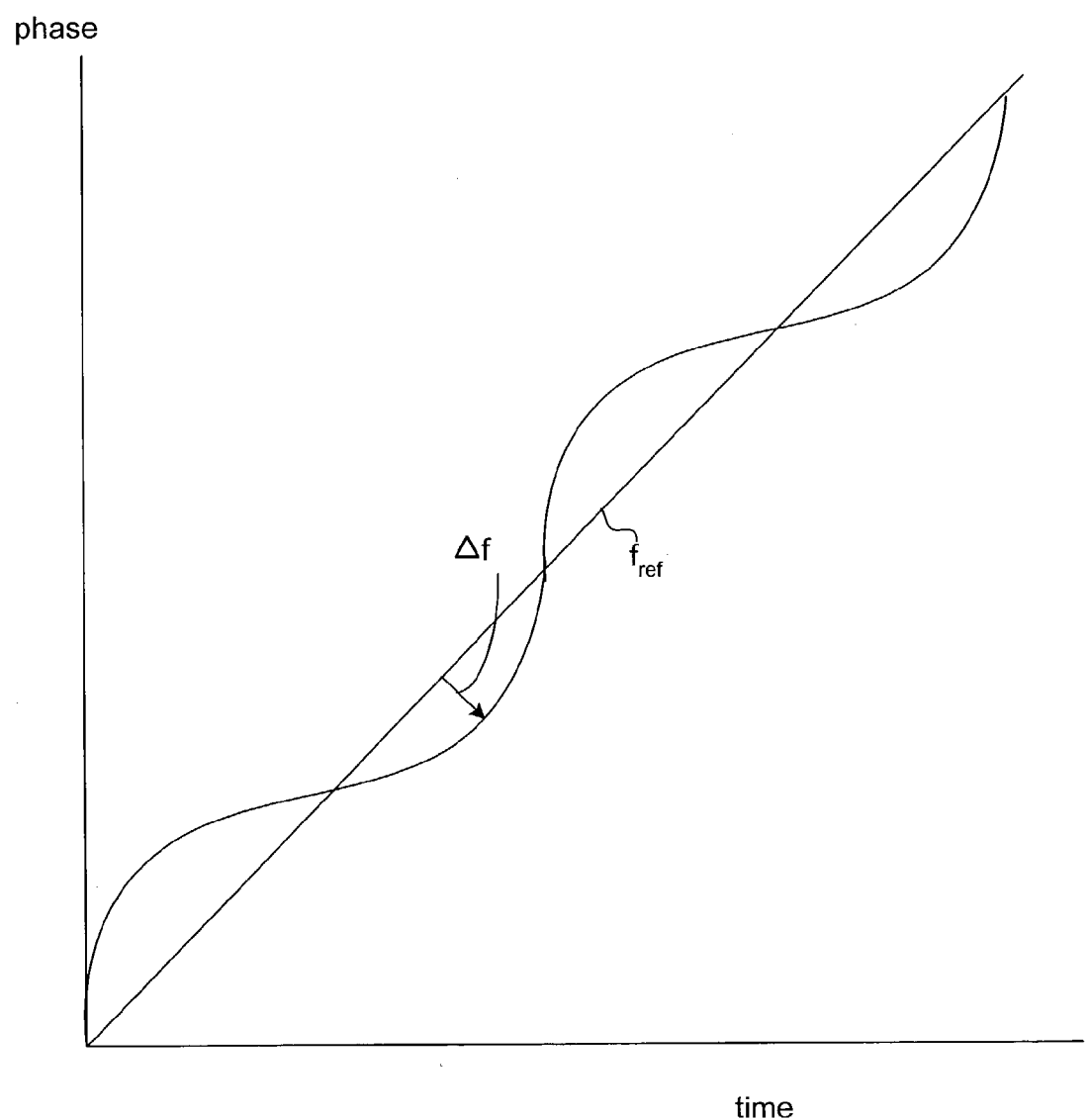
Figure 4C:
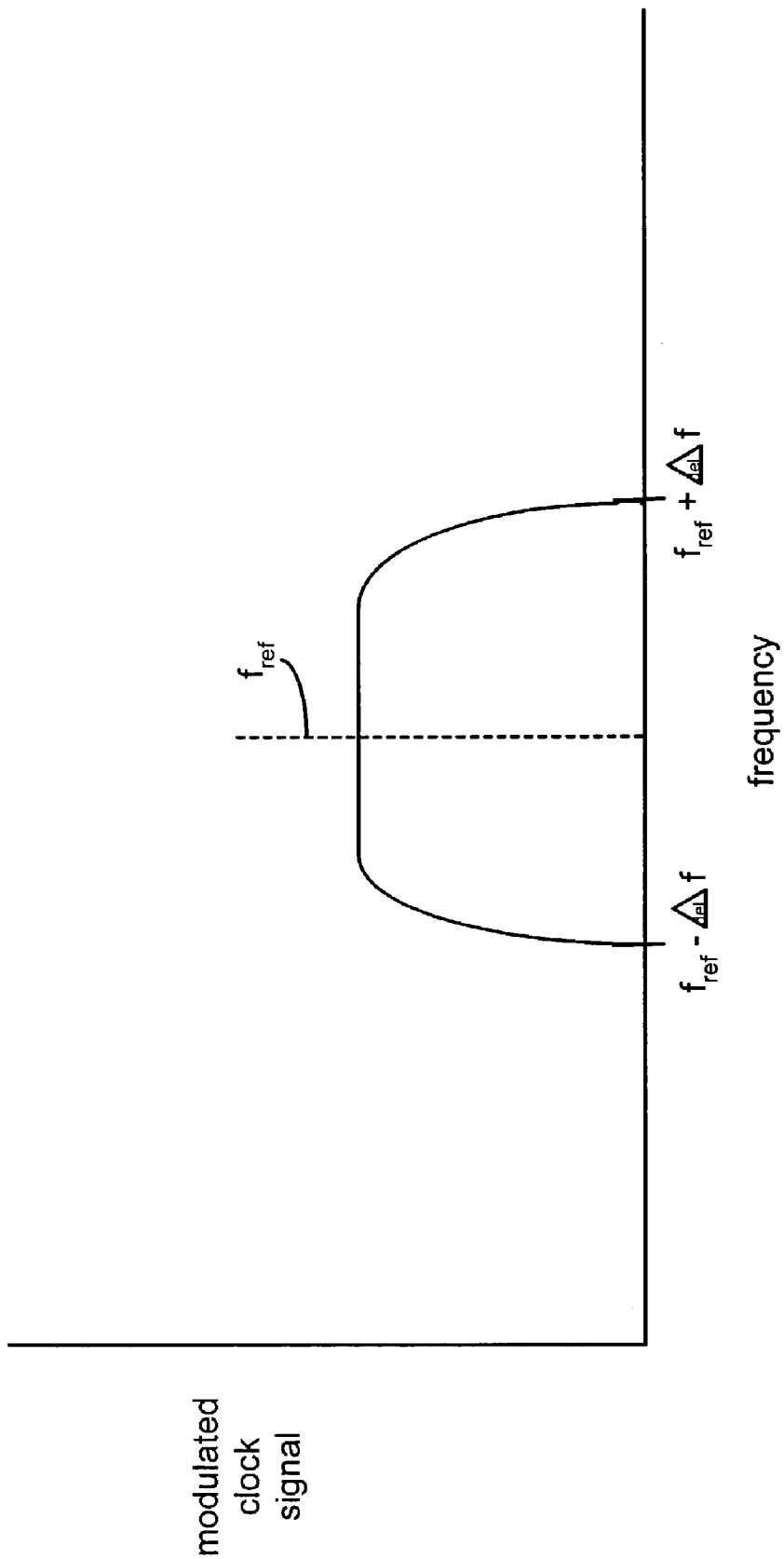

During operation, the adder unit 210 adds the clock modulation signal $CLK_{mod}$ to the nominal signal $CLK_{nom}$ thereby generating a modulated signal 220 provided as input to the phase accumulator 212. The phase accumulator 212 responds by sampling the reference clock signal $CLK_{ref}$ based upon the received modulated signal 220 thereby producing an accumulator output signal 222 shown in FIG. 4A. In accordance with an embodiment of the invention, the accumulator output signal 222 provides a frequency spread $\Delta f$ around a central reference frequency $f_{ref}$ directly related to the clock modulation signal $CLK_{mod}$. FIGS. 4B and 4C illustrate at least one advantage of the invention in that although the output clock $CLK_{out}$ signal is frequency modulated by the clock modulation signal $CLK_{mod}$, the central frequency $f_{ref}$ remains unchanged.

Figure 5:
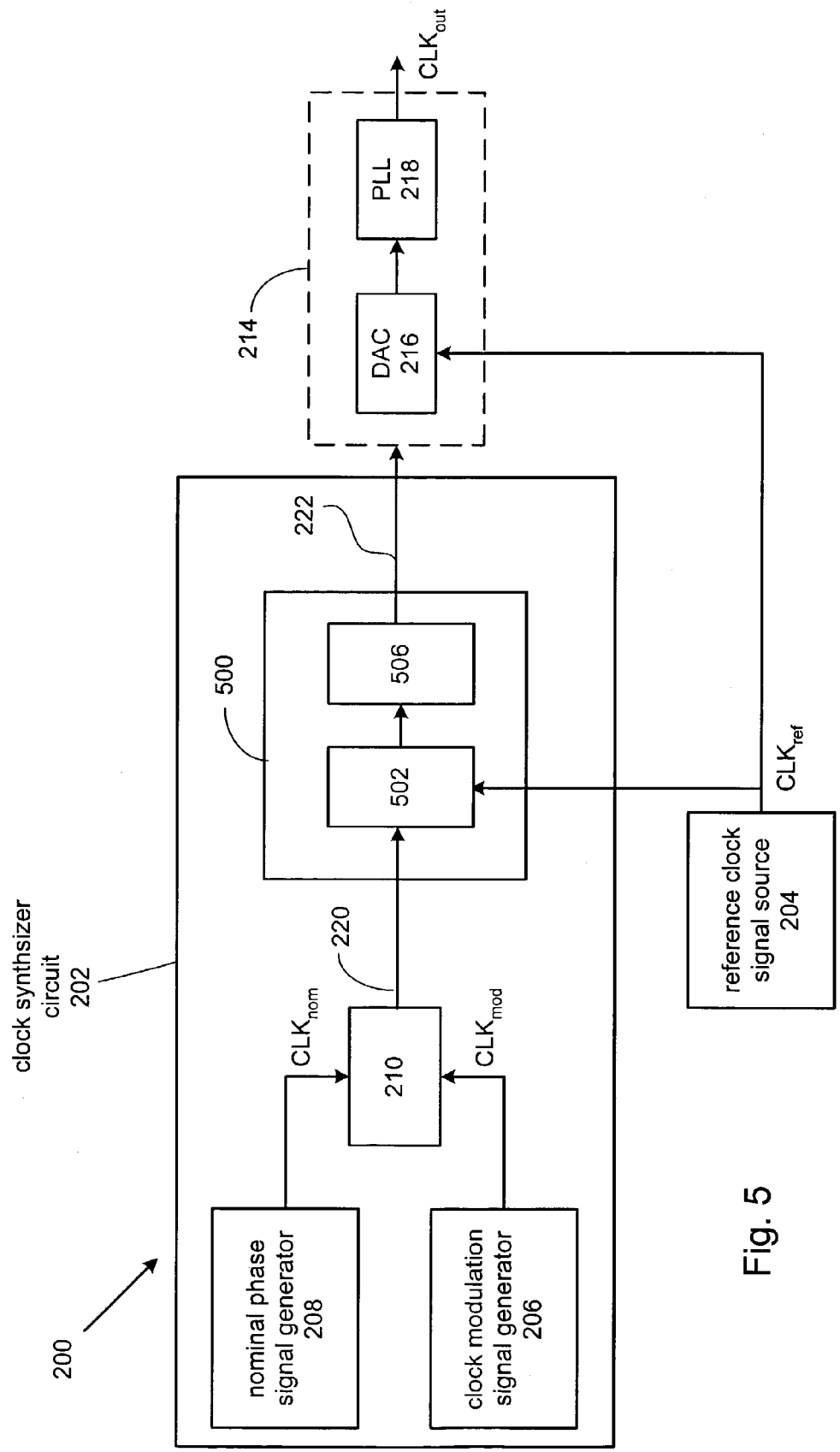
FIG. 5 shows the clock modulator circuit that takes the form of a direct digital synthesizer circuit (DDS) in a particular embodiment of the invention.

In one embodiment shown in FIG. 5, the clock modulation circuit 202 takes the form of a direct digital synthesizer circuit (DDS) 500. The generation of the output clock $CLK_{out}$ signal from the reference clock signal $CLK_{ref}$ and the clock modulation signal $CLK_{mod}$ is performed by a phase accumulator circuit 502. In some embodiments, the phase accumulator circuit 502 is coupled to a ROM lookup table of sinusoidal magnitude values 506. In this embodiment, the sampled output of the phase accumulator 502 is then used to address the ROM lookup table of sinusoidal magnitude values 506. It should be noted that in this situation, the conversion of the sampled phase to a sinusoidal magnitude is analogous to the projection of the real or imaginary component in time. Since the number of bits used by the phase accumulator 502 determines the granularity of the frequency adjustment steps of the output clock $CLK_{out}$ signal, a typical phase accumulator size is 24 to 32 bits. Since the use the DDS 500 requires that the nominal value of the output clock $CLK_{out}$ signal cannot be greater than approximately ½ of the reference clock signal $CLK_{ref}$, the output clock $CLK_{out}$ signal depends upon the phase locked loop (PLL) circuit 218.

Figure 6:
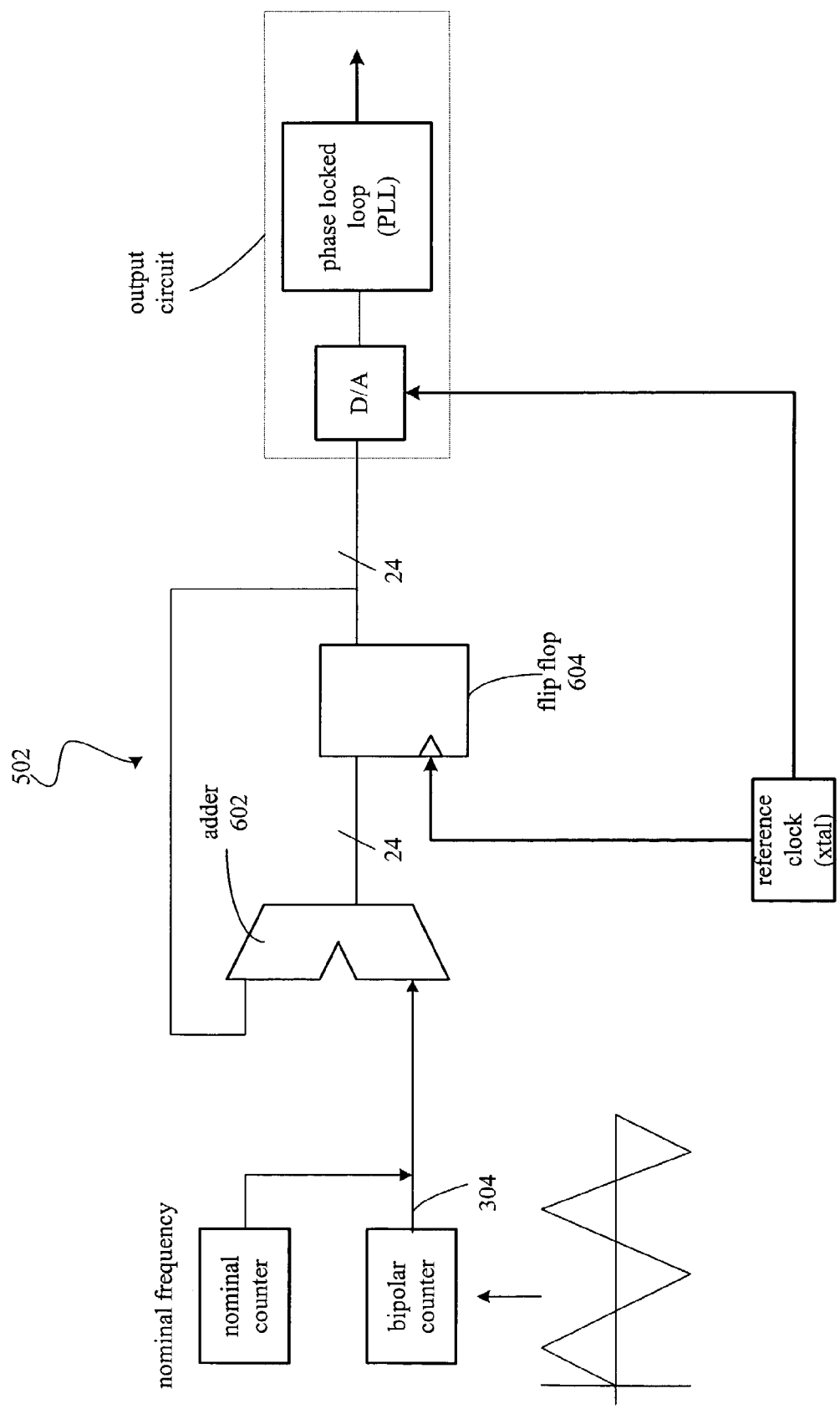
FIG. 6 shows a particular implementation of a phase accumulator circuit in accordance with an embodiment of the invention.

In one implementation shown in FIG. 6, during operation, the phase accumulator circuit 502 is loaded synchronous to the reference clock signal $CLK_{ref}$ with an N bit frequency word F (where N is typically 24) based upon the clock modulation signal $CLK_{mod}$. This frequency word F is continuously accumulated with the last sampled phase value by an N bit adder 602. The output of the adder 602 is sampled at the reference clock signal $CLK_{ref}$ coupled to the N bit adder 602. When the accumulator circuit 502 reaches the N bit maximum value (modified by the clock modulation signal $CLK_{mod}$) the accumulator circuit 502 rolls over and continues.

Figure 7:
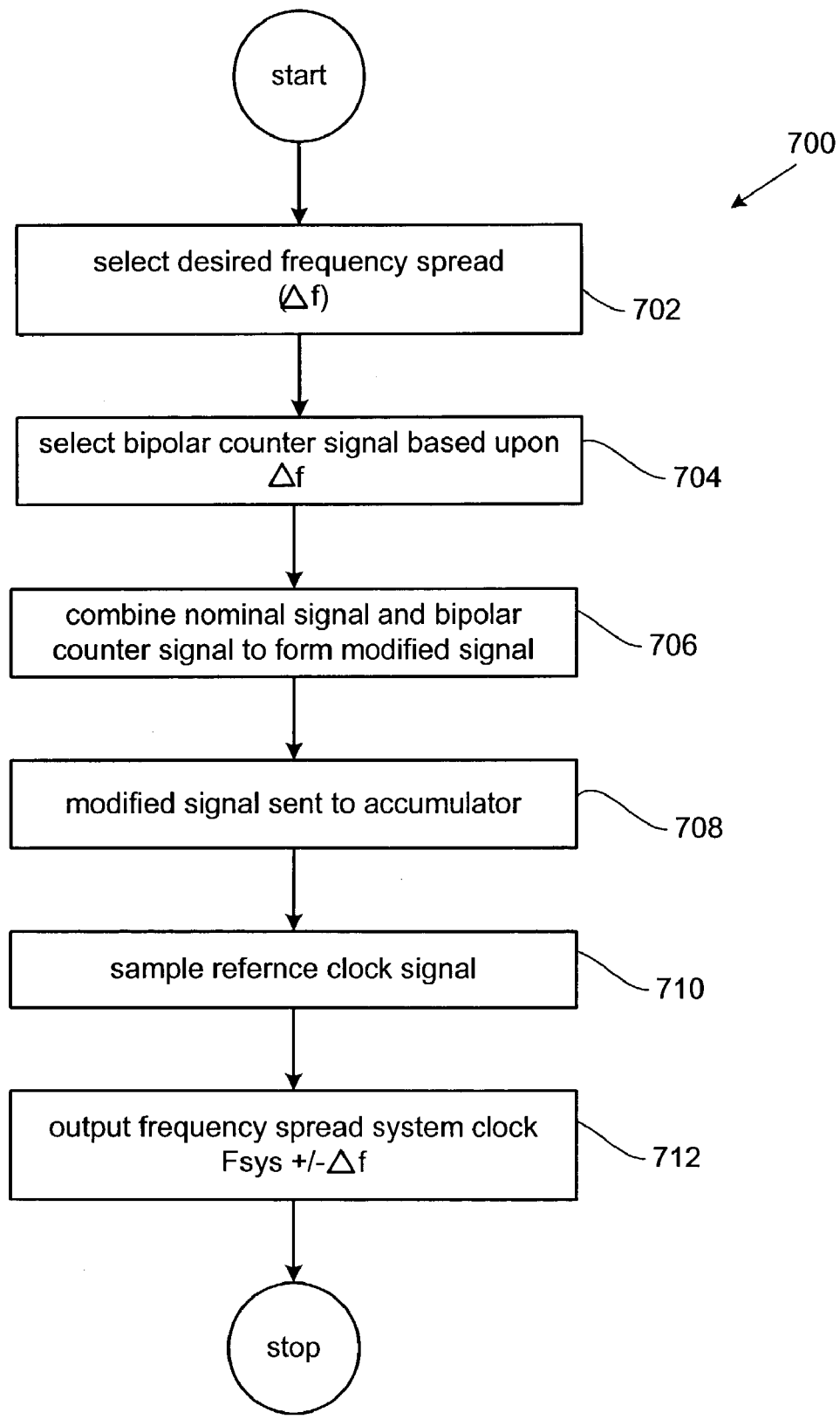
FIG. 7 shows a flowchart detailing a process for providing a spread spectrum based modified clock in accordance with an embodiment of the invention.

FIG. 7 shows a flowchart detailing a process 700 for providing a spread spectrum based modified clock in accordance with an embodiment of the invention. The process begins at 702 by selecting a desired frequency spread Δf. Once a particular frequency spread Δf has been selected, a bipolar counter signal is selected based upon the selected frequency spread Δf at 704. It should be noted that the bipolar counter signal is a periodic signal having an average value of substantially zero. The selected bipolar counter signal is then combined with a nominal phase signal at 706 to form a modified phase signal which, in turn, is provided to a phase accumulator circuit at 708. The phase accumulator circuit then samples a reference clock signal based upon the modified phase signal at 710. The sampled reference clock signal as output of the phase accumulator is then provided to an output circuit suitably arranged to provide a modified output clock signal at 712 having a substantially unchanged central frequency and the selected frequency spread Δf.

Figure 8:
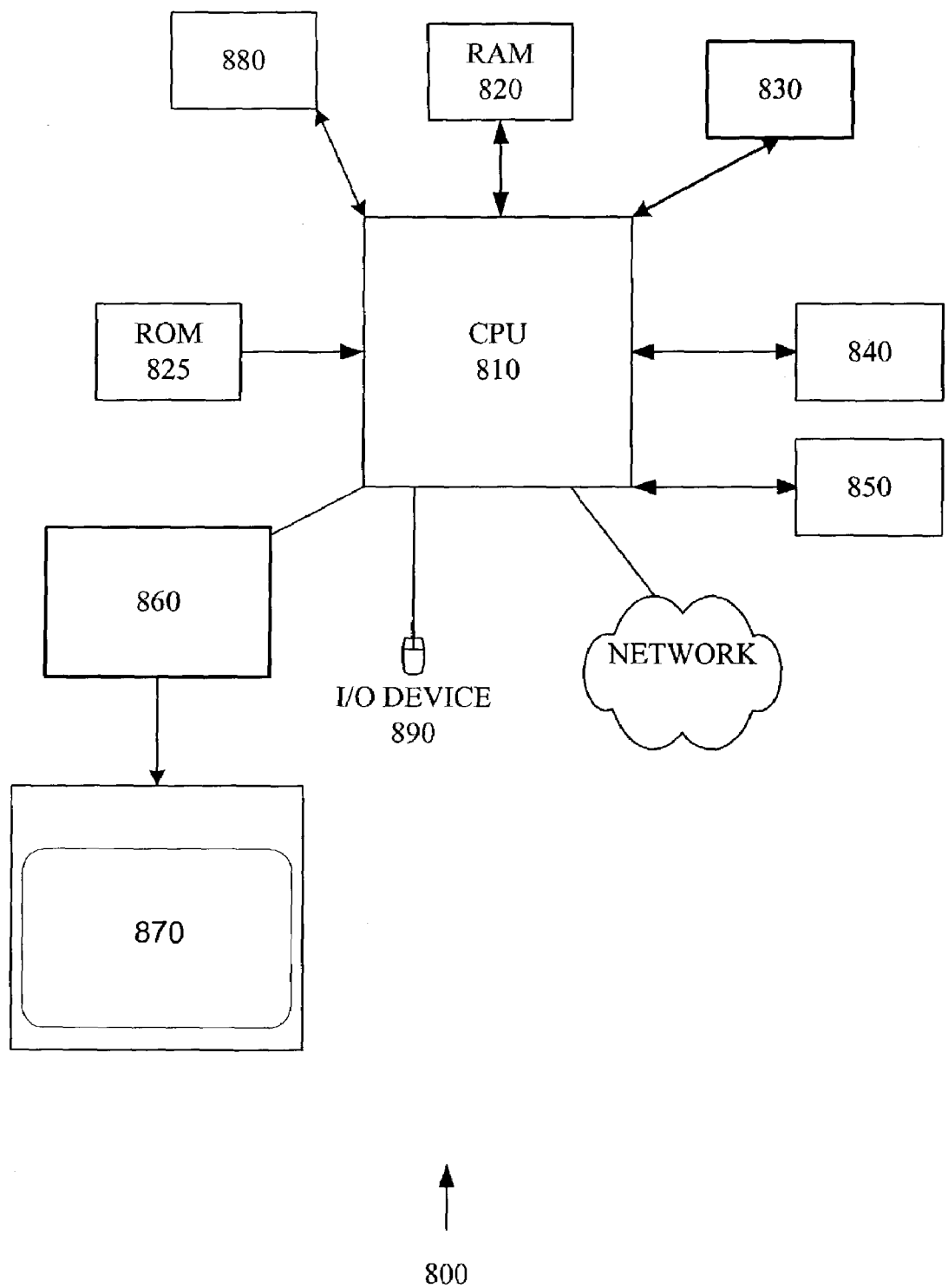
FIG. 8 illustrates a computer system 800 employed to implement the invention.

FIG. 8 illustrates a computer system 800 employed to implement the invention. Computer system 800 is only an example of a graphics system in which the present invention can be implemented. Computer system 800 includes central processing unit (CPU) 810, random access memory (RAM) 820, read only memory (ROM) 825, one or more peripherals 830, graphics controller 860, primary storage devices 840 and 850, and digital display unit 870. CPUs 810 are also coupled to one or more input/output devices 890 that may include, but are not limited to, devices such as, track balls, mice, keyboards, microphones, touch-sensitive displays, transducer card readers, magnetic or paper tape readers, tablets, styluses, voice or handwriting recognizers, or other well-known input devices such as, of course, other computers. Graphics controller 860 generates analog image data and a corresponding reference signal, and provides both to digital display unit 870. The analog image data can be generated, for example, based on pixel data received from CPU 810 or from an external encode (not shown). In one embodiment, the analog image data is provided in RGB format and the reference signal includes the VSYNC and HSYNC signals well known in the art. However, it should be understood that the present invention can be implemented with analog image, data and/or reference signals in other formats. For example, analog image data can include video signal data also with a corresponding time reference signal.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A clock synthesizer circuit arranged to provide a selectable spread spectrum based output clock signal, comprising:
    a phase accumulator;
    a reference clock source coupled to the phase accumulator circuit arranged to provide a reference clock signal;
    an adder unit coupled to the phase accumulator;
    a nominal phase source coupled to the adder unit arranged to provide a nominal phase signal; and
    a modulated phase source coupled to the adder unit arranged to provide a phase modulation signal, wherein the adder unit combines the nominal phase signal and the phase modulation signal to form a frequency shift signal as input to the phase accumulator that uses the frequency shift signal to sample the reference clock signal so as to produce the output clock signal having a central frequency about the same as the reference clock signal and an associated frequency spread based on the phase modulation signal.

2. A circuit as recited in claim 1, wherein the phase modulation signal is a periodic bipolar signal taking the form of a symmetric positive and negative-going waveform having an average value of about zero.

3. A circuit as recited in claim 2 further comprising:
    a frequency spread selector for selecting a frequency spread:
    a selectable bipolar counter selected based upon the selected frequency spread; and
    a bipolar counter signal generator for generating a bipolar counter signal based upon the selected bipolar counter.

4. A circuit as recited in claim 3, wherein the adder combines the reference signal and the bipolar counter signal.

5. A circuit as recited in claim 1, wherein the phase accumulator circuit is coupled to a read only memory (ROM) look up table.

6. A circuit as recited in claim 5, wherein the ROM look up table includes sinusoidal magnitude values.

7. A circuit as recited in claim 6, wherein a sampled output of the phase accumulator provides an input signal to the ROM look up table in order to convert the sampled output signal to a sinusoidal magnitude signal.

8. A method of providing a selectable spread spectrum based output clock signal, comprising:
   providing a reference clock signal;
   providing a nominal phase signal;
   providing a phase modulation signal;
   combining the nominal phase signal and the phase modulation signal to form a frequency shift signal; and
   Sampling the reference clock signal using the frequency shift signal so as to produce the output clock signal having a central frequency about the same as the reference clock signal and an associated frequency spread based on the phase modulation signal.

9. A method as recited in claim 8 wherein the phase modulation signal is a periodic bipolar signal taking the form of a symmetric positive and negative-going waveform having an average value of about zero.

10. A method as recited in claim 9 further comprising:
    selecting the frequency spread;
    selecting a bipolar counter based upon the selected frequency spread;
    generating a bipolar counter signal based upon the selected bipolar counter.

11. A method as recited in claim 10, comprising:
    producing the output clock signal by combining the reference signal and the bipolar counter signal.

12. A method as recited in claim 8, further comprising providing a read only memory (ROM) look up table that includes sinusoidal magnitude values; and
converting the sampled reference clock signal to a sinusoidal magnitude signal based upon the sinusoidal magnitude values included in the ROM lookup table.

13. Computer program product for providing a selectable spread spectrum based output clock signal, comprising:
    computer code for providing a reference clock signal;
    computer code for providing a nominal phase signal;
    computer code for providing a phase modulation signal;
    computer code for combining the nominal phase signal and the phase modulation signal to form a frequency shift signal; computer code for sampling the reference clock signal using the frequency shift signal so as to produce the output clock signal having a central frequency about the same as the reference clock signal and an associated frequency spread based on the phase in modulation signal; and
    computer readable medium for storing the computer code.

14. Computer program product as recited in claim 13 wherein the phase modulation signal is a periodic bipolar signal taking the form of a symmetric positive and negative-going waveform having an average value of about zero.

15. Computer program product as recited in claim 14 further comprising:
    selecting the frequency spread;
    selecting a bipolar counter based upon the selected frequency spread; and
    generating a bipolar counter signal based upon the selected bipolar counter.

16. Computer program product as recited in claim 15, comprising: computer code for producing the output clock signal by combining the reference signal and the bipolar counter signal.

* * * * *

UNITED STATES PATENT AND TRADEMARK OFFICE
CERTIFICATE OF CORRECTION

PATENT NO. : 6,982,707 B2 Page 1 of 1
APPLICATION NO. : 10/323557
DATED : January 3, 2006
INVENTOR(S) : Vincent Wang It is certified that error appears in the above-identified patent and that said Letters Patent is hereby corrected as shown below:

In line 4 of claim 10 (column 7, line 28) insert --and-- after "spread".

line 17 of claim 13 (column 8, line 17) delete "in" after "phase".

Signed and Sealed this

Fifteenth Day of August, 2006

JON W. DUDAS
*Director of the United States Patent and Trademark Office*